(12) United States Patent
Dale

(10) Patent No.: US 12,463,900 B2
(45) Date of Patent: Nov. 4, 2025

(54) DYNAMIC FORWARD INFORMATION BASE PREFIX OPTIMIZATION

(71) Applicant: Arista Networks, Inc., Santa Clara, CA (US)

(72) Inventor: Lincoln Dale, Mountain View, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 402 days.

(21) Appl. No.: 18/153,607

(22) Filed: Jan. 12, 2023

(65) Prior Publication Data

US 2023/0155936 A1 May 18, 2023

Related U.S. Application Data

(63) Continuation of application No. 16/912,644, filed on Jun. 25, 2020, now Pat. No. 11,558,294, which is a continuation of application No. 15/908,698, filed on Feb. 28, 2018, now Pat. No. 10,742,549, which is a continuation of application No. 14/878,801, filed on Oct. 8, 2015, now Pat. No. 9,942,140.

(51) Int. Cl.
*H04L 45/74* (2022.01)

(52) U.S. Cl.
CPC .................. *H04L 45/74* (2013.01)

(58) Field of Classification Search
CPC ........................................... H04L 45/74
See application file for complete search history.

(56) References Cited

U.S. PATENT DOCUMENTS

2009/0003348 A1* 1/2009 Kulkarni ............... H04L 45/22
                                                        370/392
2016/0014028 A1* 1/2016 He ........................ H04L 45/54
                                                        370/392

* cited by examiner

*Primary Examiner* — Mansour Oveissi
(74) *Attorney, Agent, or Firm* — Sprinkle IP Law Group

(57) ABSTRACT

A network device includes a routing information base including a first plurality of entries, a forwarding information base including a second plurality of entries; a forwarding information base entry optimizer that programs the second plurality of entries of the forwarding information base using, at least in part, the first plurality of entries; and a network processor that forwards packets based on the second plurality of entries of the forwarding information base. The second plurality of entries is less than the first plurality of entries.

20 Claims, 6 Drawing Sheets

DYNAMIC FORWARD INFORMATION BASE PREFIX OPTIMIZATION

CROSS-REFERENCE TO RELATED APPLICATIONS

This application is a continuation of U.S. patent application Ser. No. 16/912,644, filed on Jun. 25, 2020, entitled "DYNAMIC FORWARD INFORMATION BASE PREFIX OPTIMIZATION," issued as U.S. Pat. No. 11,558,294, which is a continuation of U.S. patent application Ser. No. 15/908,698, filed on Feb. 28, 2018, entitled, "DYNAMIC FORWARD INFORMATION BASE PREFIX OPTIMIZATION," issued as U.S. Pat. No. 10,742,549, which is a continuation of U.S. patent application Ser. No. 14/878,801, filed on Oct. 8, 2015, entitled "DYNAMIC FORWARD INFORMATION BASE PREFIX OPTIMIZATION," issued as U.S. Pat. No. 9,942,140, which are hereby incorporated by reference in their entirety.

BACKGROUND

Network infrastructure such as routers or switches may receive packets and forward them to facilitate network communications. The network infrastructure may include a number of ports and each port may provide an operable connection to another piece of network infrastructure. The network infrastructure may include a forwarding information base (FIB). The FIB may include information that enables the network infrastructure to forward received packets to a recipient identified by the packet.

SUMMARY

In one aspect, a method of programming a forwarding information base according to one or more embodiments may comprise obtaining, by a forwarding information base entry optimizer, a first route prefix to be loaded into the forwarding information base; determining, by the forwarding information base entry optimizer, that the forwarding information base includes a supernet route prefix associated with the first route prefix; and associating, by the forwarding information base entry optimizer, the first route prefix with the supernet route prefix.

In one aspect, a method of programming a forwarding information base according to one or more embodiments may comprise identifying, by a forwarding information base entry optimizer, a first plurality of route prefixes associated with a potential whitespace route prefix; making a first determination, by the forwarding information base entry optimizer, that the whitespace rate is greater than a predetermined rate; based on the first determination: loading, by the forwarding information base entry optimizer, the potential whitespace route prefix into the forwarding information base (FIB); and removing, by the forwarding information base entry optimizer, the first plurality of route prefixes from the FIB.

In one aspect, a method of programming a forwarding information base according to one or more embodiments may comprise obtaining, by a forwarding information base entry optimizer, a first route prefix to be unloaded from the forwarding information base making a first determination, by the forwarding information base entry optimizer, that the first route prefix is associated with a whitespace route prefix in the forwarding information base; and based on the first determination: disassociating, by the forwarding information base entry optimizer, the first route prefix from the whitespace route prefix.

In one aspect, a network device according to one or more embodiments may comprise a routing information base comprising a first plurality of entries; a forwarding information base comprising a second plurality of entries; a forwarding information base entry optimizer configured to program the second plurality of entries of the forwarding information base using, at least in part, the first plurality of entries; and a network processor configured to forward packets based on the second plurality of entries of the forwarding information base, wherein the second plurality of entries is less than the first plurality of entries.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for programming a forwarding information base (FIB) of a network device. The network device may be a router, switch, multilayer switch, or other device that may support network communications. To support network communications, the network device may be configured to receive packets, identify a recipient of the packets, and forward the received packets towards the identified recipient. The FIB may include information required to forward the received packets towards the recipient. The network device may be a part of a network (e.g., a local area network, a wide area network, the Internet, etc.).

In one or more embodiments of the invention, the network device may include a FIB entry optimizer. The FIB entry optimizer may be configured to program the FIB. The FIB entry optimizer may aggregate and/or consolidate information stored in the FIB. The FIB entry optimizer may aggregate and/or consolidate information stored in the FIB by utilizing less specific routing prefixes to represent a number of more specific routing prefixes. When a less specific routing prefix is used to represent a number of more specific routing prefixes, associations between each of the number of more specific routing prefixes and the less specific routing prefix are stored. These associations may enable a network device to track which entries of a RIB are represented in the FIB when each entry of the RIB is not programmed into the FIB.

Figure 1:
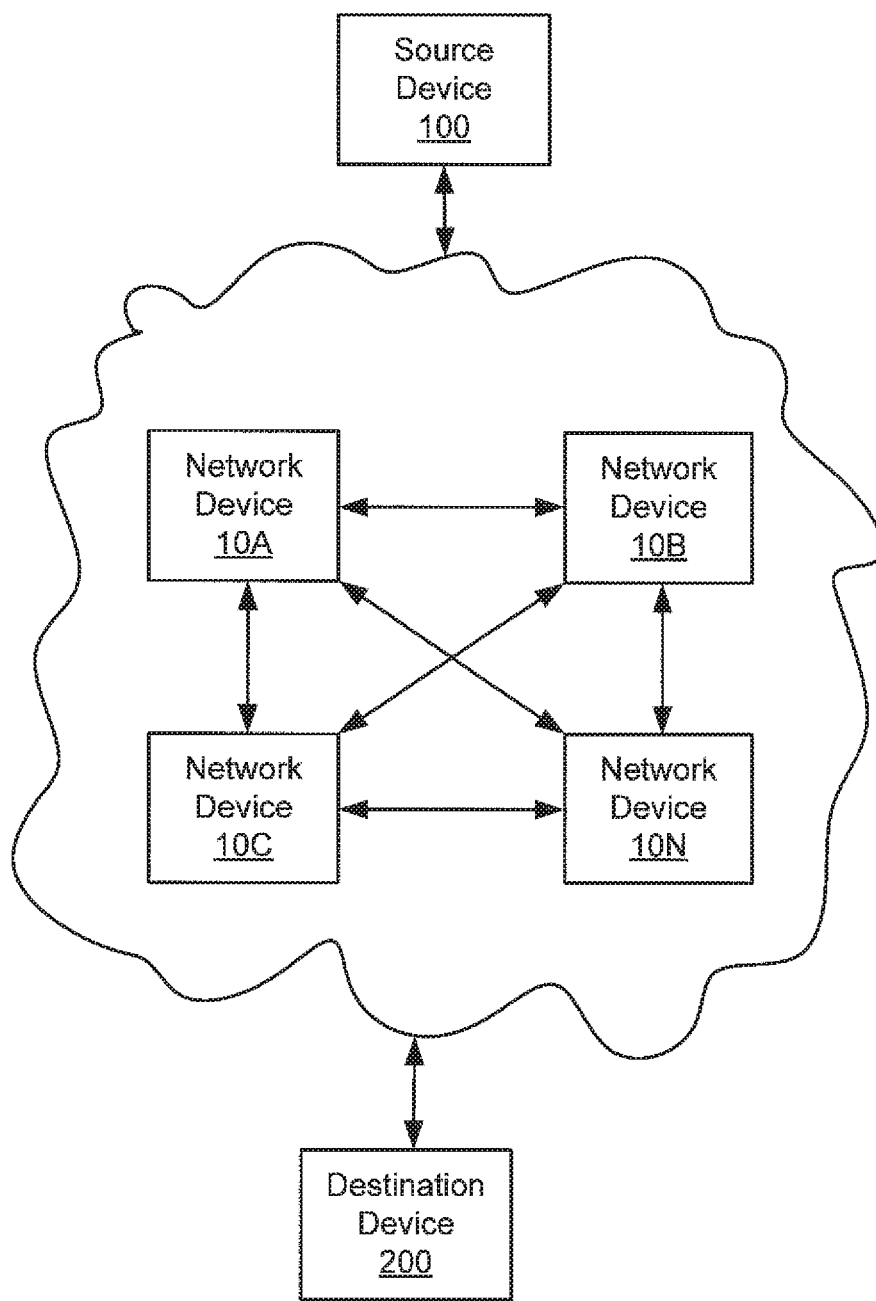
FIG. 1 shows a system in accordance with one or more embodiments of the invention.

FIG. 1 shows an example of a network in accordance with one or more embodiments of the invention. The example network shown in FIG. 1 includes a source device (100), a destination device (200), and network devices (10A-10N). Each of the aforementioned devices may be interconnected by a communication network supporting one or more networking protocols. For example, network device 10A may be connected by operable communications links to network devices 10B, 10C, and 10N as indicated by the arrows. The network may include any number of source devices, destination devices, and network devices without departing from the invention. Additionally, each of the aforementioned devices may include any number of communication links without departing from the invention. In one embodiment of the invention, the network may be the Internet.

In one or more embodiments of the invention, a source device (100) may communicate with a destination device (200) using one or more networking protocols. More specifically, the source device (100) may generate a packet that identifies the destination device (200) and send the packet to one of the network devices (10A-10N). Upon receipt of the packet, the network device (10A-10N) may determine a communication link on which to forward the packet based on the information included in a FIB (not shown) of the network device (10A-10N).

For example, network device 10A may receive the packet from the source device. Network device 10A may include three communication links to network devices 10B, 10C, and 10N, respectively. Network device 10A may determine to which of network devices 10B, 10C, and 10N to forward the packet based on the destination device (200) identified by the packet and the information included in the FIB.

Figure 2:
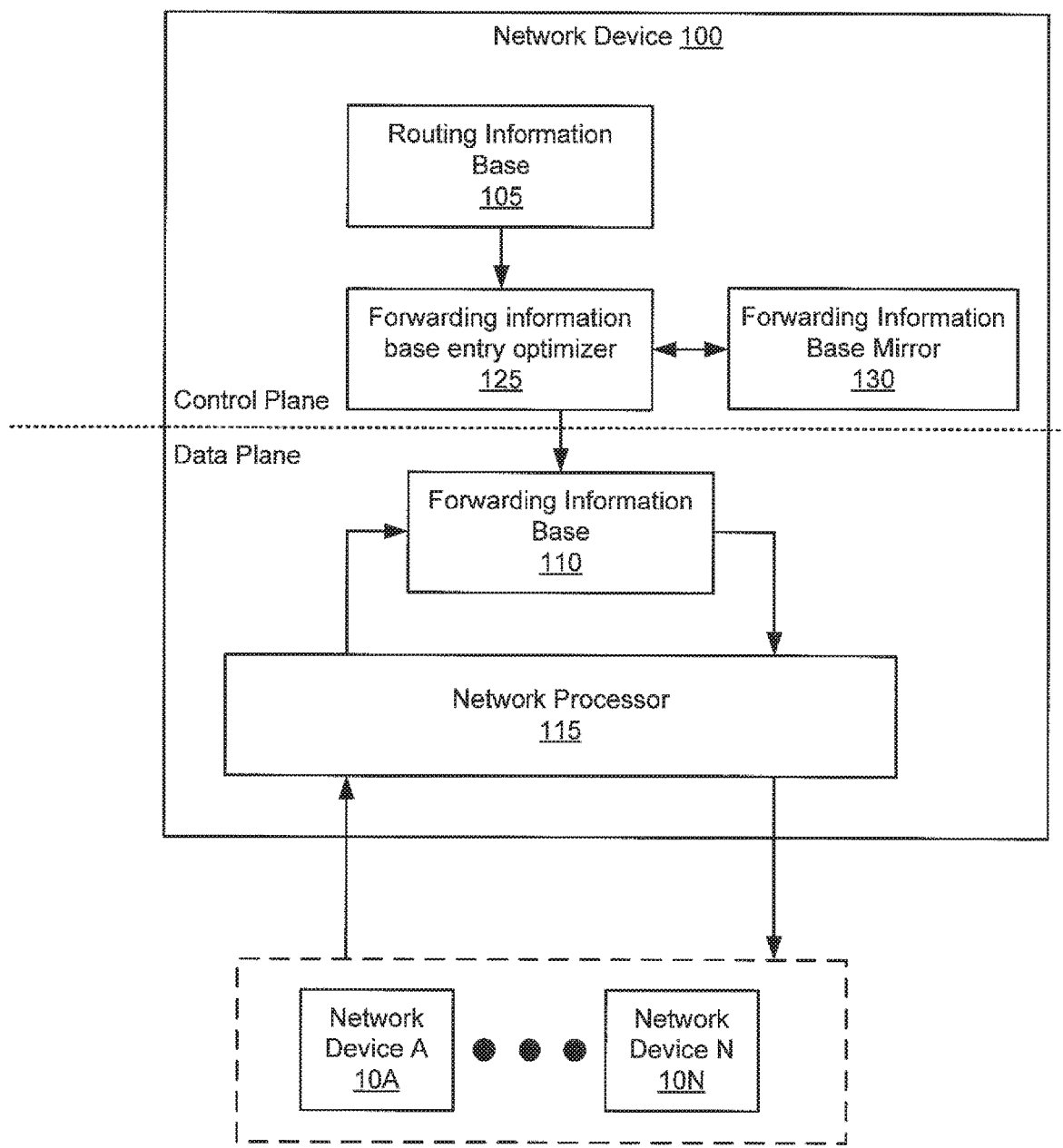
FIG. 2 shows a network device in accordance with one or more embodiments of the invention.

FIG. 2 shows a network device (100) in accordance with one or more embodiments of the invention. The network device (100) may be configured to receive and forward packets c in accordance with one or more networking protocols.

The network device (100) may be a physical device that includes non-transitory storage, memory (e.g. Random Access Memory), and one or more processors. The non-transitory storage may include instructions, which when executed by the one or more processors enable the network device (100) to perform the functions described in this application and shown in FIGS. 3-5.

The network device (100) may include a network processor (115), forwarding information base (FIB) (110), routing information base (RIB) (105) forwarding information base entry optimizer (125), and a forwarding information base mirror (130). Each of the components of the network device (100) is described below.

In one or more embodiments of the invention, the network processor (115) may be a physical device that includes functionality to enable the network device to communicate with other devices (e.g., other network devices, source devices, and/or destination devices) using one or more networking protocols. The network processor (115) may be configured to receive packets from one or more devices and forward the received packets to other components of the network device (100). Further, the network processor (115) may be configured to receive packets from components of the network device (100) and forward the packets to one or more devices. The network processor may be, for example, an embedded hardware device. For example, the embedded hardware device may be a field programmable gate array (FPGA), application specific integrated circuit (ASIC), and/ or digital signal processor (DSP).

In one or more embodiments of the invention, the network processor (115) may be configured to identify packets received from devices that are to be forwarded to other devices. Upon identification of a to-be-forwarded packets, the network processor (115) may retrieve, from the FIB, information that identifies to which device the to-be-forwarded packet is to be sent.

To enable the network device (100) to perform packet forwarding, the network device may include a RIB (105) and a FIB (110). The RIB and FIB may both be data structures that include information related to the topology of a network. The RIB and FIB may be stored on the network device.

In one embodiment of the invention, the RIB may be a database that lists all routes to destinations in a network from the network device. The RIB may be continuously or periodically updated by the network device (100) or an external source such as a network controller (not shown) as the topology of a network changes. The routing information base (105) may include statistical information relating to the routes. The statistical information may classify the quality of potential routes to destinations in the network. In one or more embodiments of the invention, the RIB may operate in a control plane of the network device.

While the RIB may include all of the necessary information to forward a packet, e.g., the routes, it is computationally costly to determine packet forwarding by a RIB. To reduce the computational cost of forwarding a packet, the network device may include a FIB.

In one embodiment of the invention, the FIB (110) is a data structure that includes information to resolve the next-hop of any to-be-forwarded packet. More specifically, each entry of the FIB may include information to identify the next-hop of a received packet. In one or more embodiments of the invention, each entry of the forwarding information base (110) may include an Internet Protocol (IP) prefix (e.g., represented using classless inter-domain routing (CIDR) notation) and next-hop information (e.g., the next-hop or information to determine the next-hop). The next-hop may be specified using a Media Access Address (MAC) address and an egress port.

To improve the rate of packet forwarding, the FIB may operate in a data plane of the network device. By operating in the data plane, the computational cost of performing packet forwarding may be reduced when compared to a FIB operating in the control plane.

The FIB may be programmed by the forwarding information base entry optimizer (125). The forwarding information base entry optimizer (125) may be executing in on the network device (100) as shown in FIG. 2. The forwarding information base entry optimizer (125) may be executing on a device that is external to the network device without departing from the invention.

Figure 4:
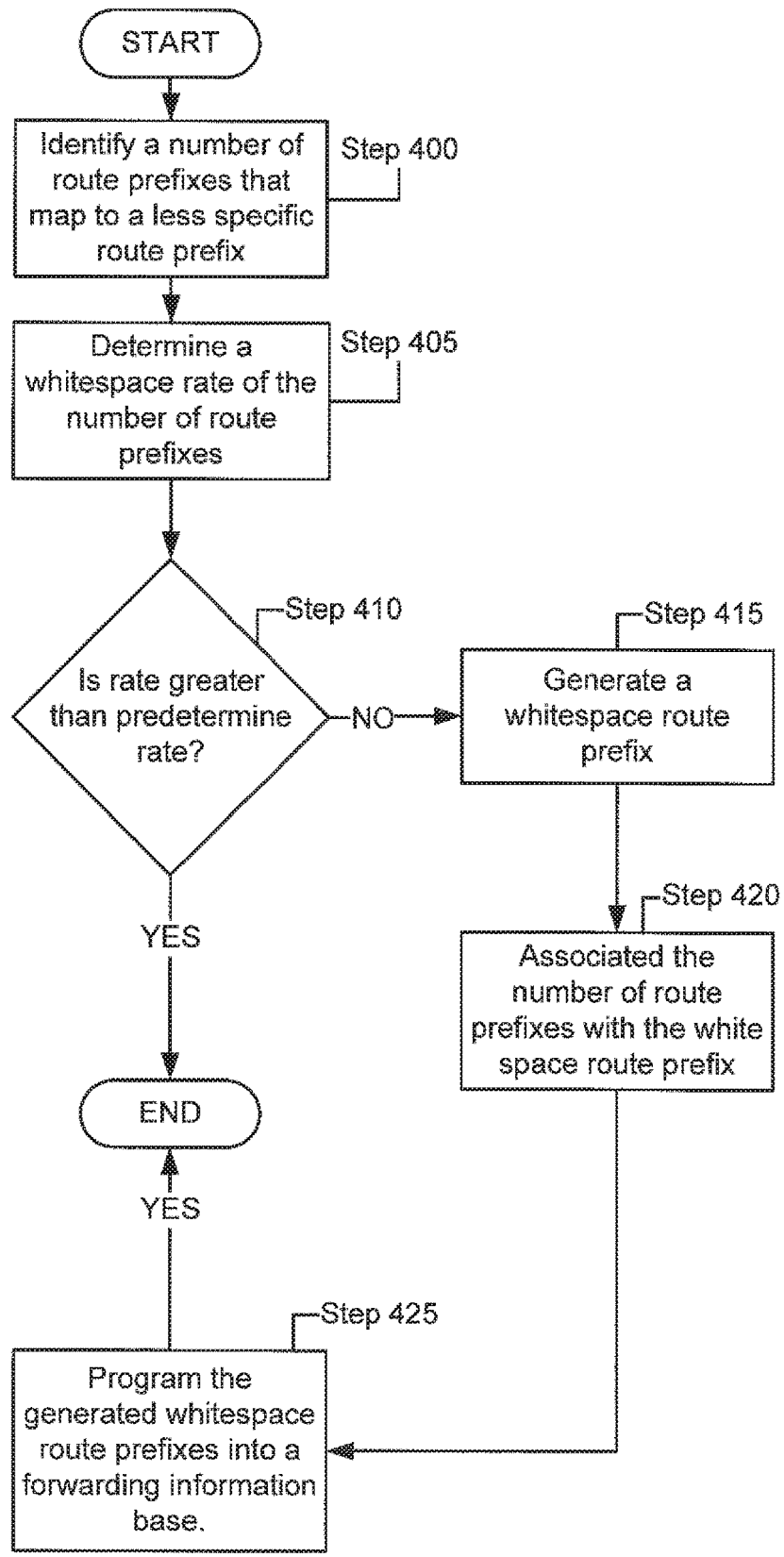
FIG. 4 shows a flowchart of a method of programming a forwarding information base in accordance with one or more embodiments of the invention.
Figure 5:
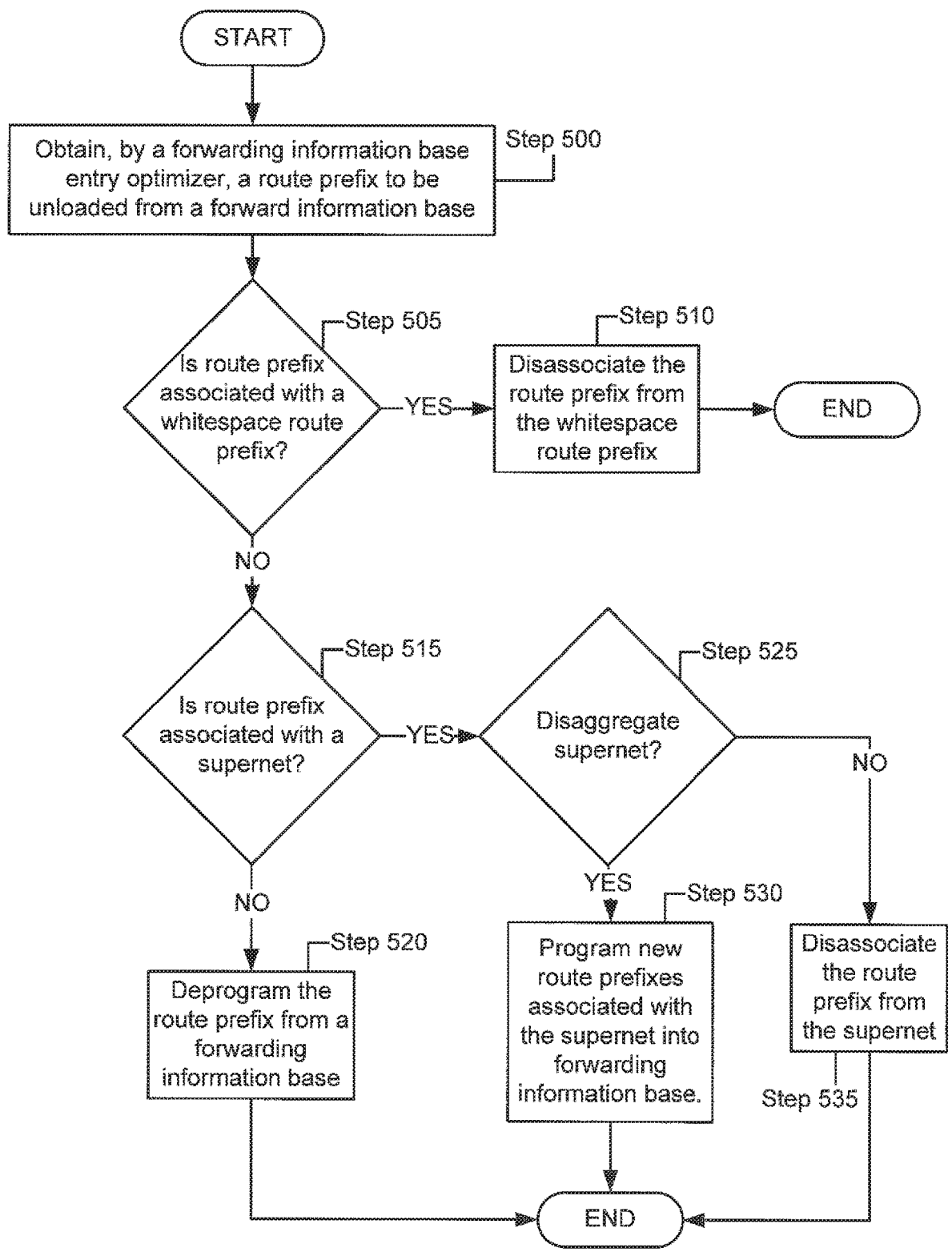
FIG. 5 shows a flowchart of a method of programming a forwarding information base in accordance with one or more embodiments of the invention.

In one embodiment of the invention, the forwarding information base entry optimizer (125) may be configured to program entries of the FIB. More specifically, the FIB may be configured to generate entries of the FIB based on changes to the RIB and consolidate multiple FIB entries to reduce the total number of entries in the FIB. The FIB may include functionality to implement the methods of programming a FIB as shown in FIGS. 3, 4, and 5. The methods may include consolidating multiple entries of the FIB by programming a supernet route prefix and/or consolidating multiple entries by programming a whitespace route prefix.

In one embodiment of the invention, a supernet route prefix may be a less specific routing prefix associated with multiple entries of the FIB having the same next-hop. By programming a supernet route prefix into the FIB, multiple entries of the FIB may be consolidated to a single entry while maintaining the information necessary to perform appropriate packet forwarding.

In one embodiment of the invention, a whitespace route prefix may be a less specific routing prefix associated with one or more route prefixes that are in the RIB and one or more route prefixes that are not in the RIB, e.g. route prefixes to which no traffic will ever be directed. By programming a whitespace route prefix into the FIB, multiple entries of the FIB may be consolidated to a single entry while maintaining the information necessary to perform appropriate packet forwarding.

In one embodiment of the invention, when the FIB entry optimizer consolidates multiple FIB entries into a single entry, each of the multiple entries of the FIB may be deleted from the FIB and the single entry may be added as an entry in the FIB. In one or more embodiments of the invention, the FIB entry optimizer may add an entry to the FIB before deleting the multiple entries of the FIB to consolidate the multiple entries. An association between the route prefixes of the deleted entries and the consolidated entry may be generated as part of the above process. The association may indicate the deleted entries are represented in the FIB by the consolidated entry. The association may be stored on the network device.

In one embodiment of the invention, the network device (100) may also include a FIB mirror (130). The FIB mirror (130) may be a data structure that mirrors the entries of the FIB. The forwarding information base mirror (130) may be used by the forwarding information base entry optimizer (125) to perform optimizations before programming entries of the FIB. The FIB mirror (130) may operate in a control plane of the network device and be stored on the network device.

In one embodiment of the invention, the forwarding information entry optimizer (125) may use the RIB to perform optimizations before programming entries of the FIB. For example, the forwarding information base entry optimizer (125) may derive FIB entries directly from information included in the RIB. In such cases, the network device may not include a FIB mirror (130).

Those skilled in the art will appreciate that the invention is not limited to the architecture shown in FIGS. 1-2.

In the following flowcharts and action diagrams, functionality of components of the system shown in FIGS. 1-2 will be described. The functionality shown in the following figures may enable, for example, a FIB to be programmed. FIGS. 3-5 show flowcharts of methods that may be performed, for example, by a network device.

Figure 3A:
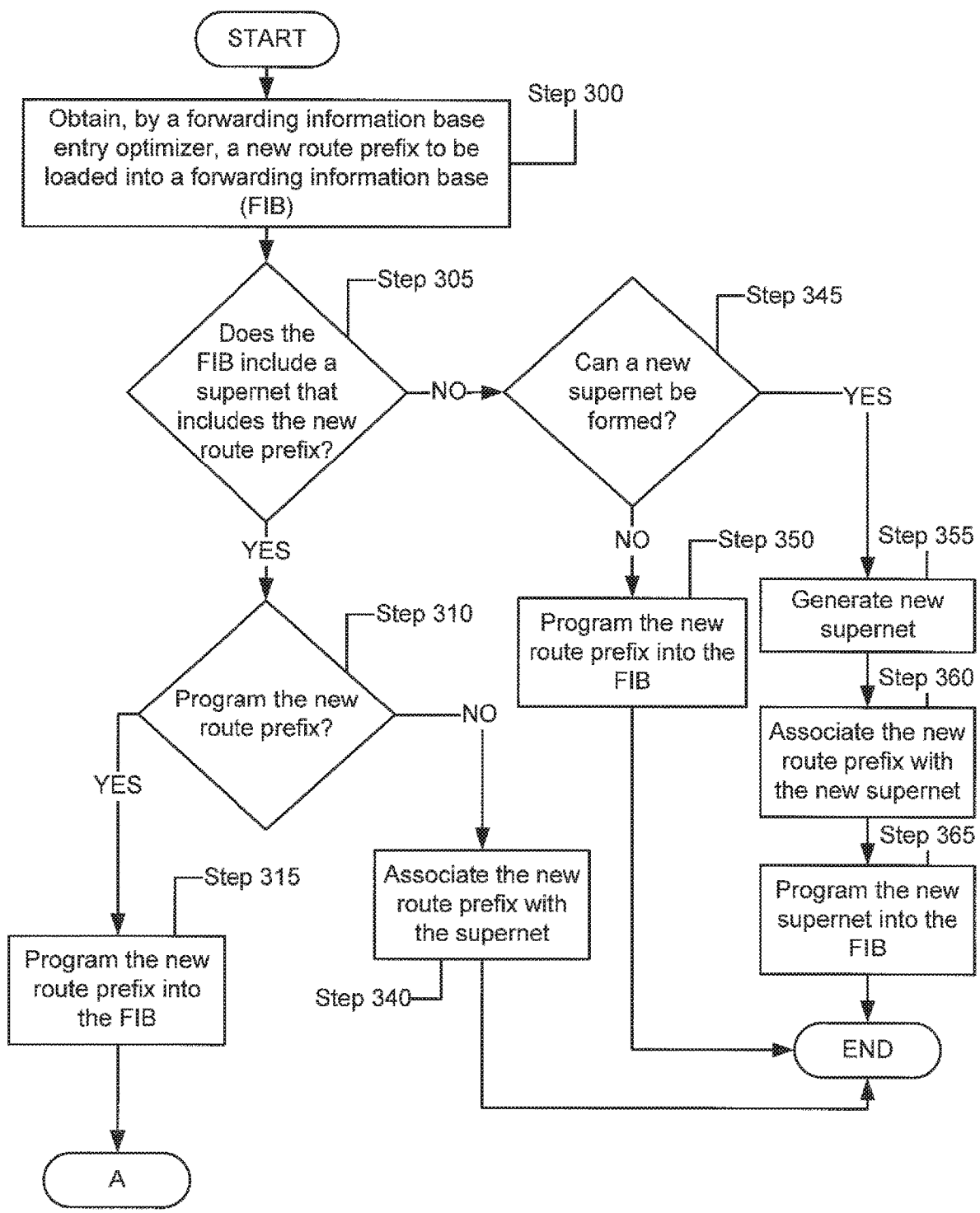
FIG. 3A shows flowchart of a method of a method of programming a forwarding information base in accordance with one or more embodiments of the invention.
Figure 3B:
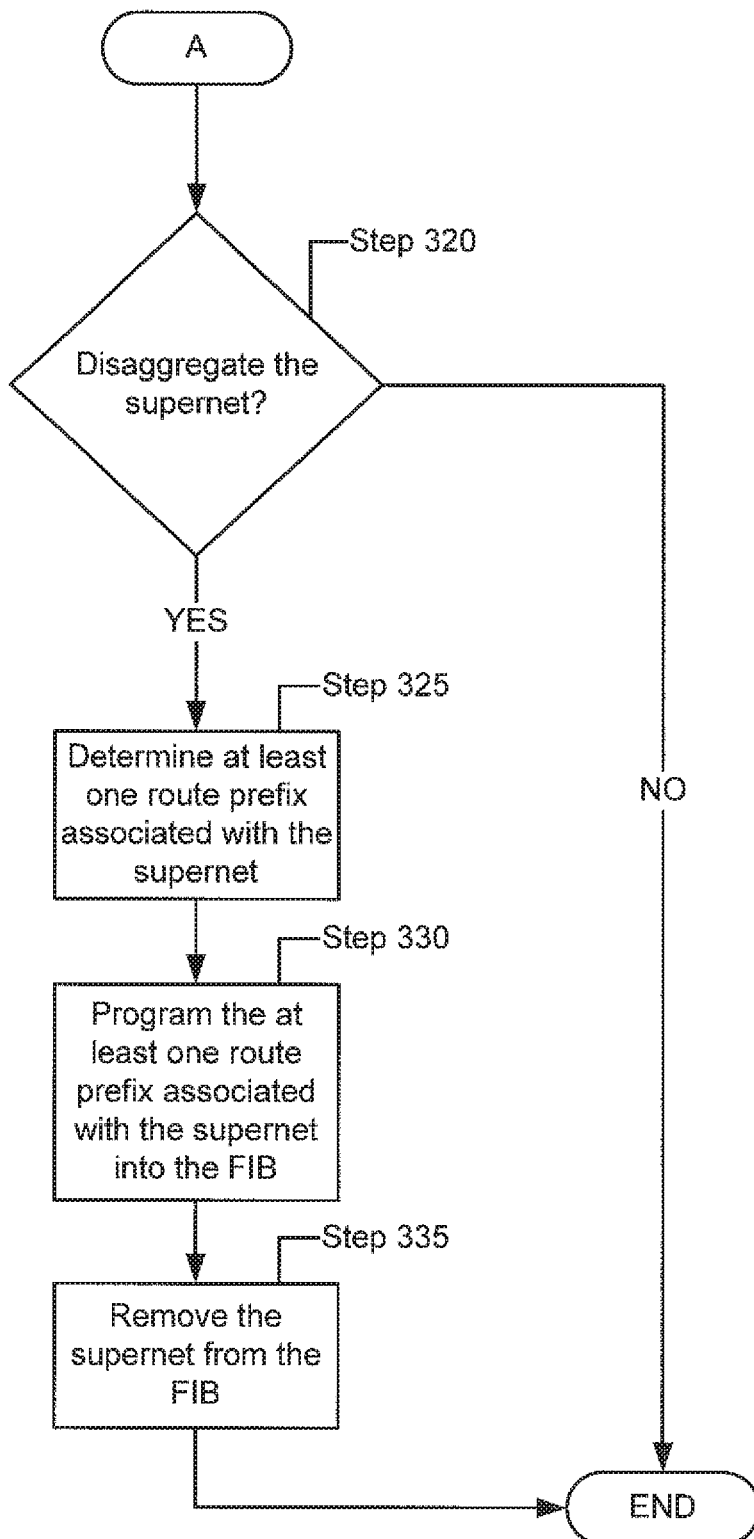
FIG. 3B shows a continuation of the flowchart of a method of programming a forwarding information base of FIG. 3A.

FIGS. 3A and 3B show a flowchart according to one or more embodiments of the invention. The method depicted in FIGS. 3A and 3B may be used to program a FIB in accordance with one or more embodiments of the invention. One or more steps shown in FIGS. 3A and 3B may be omitted, repeated, and/or performed in a different order among different embodiments.

In Step 300, a FIB entry optimizer obtains a new route prefix to be programmed into a FIB. The FIB entry optimizer may be a component of a network device as illustrated in FIG. 2.

In one or more embodiments of the invention, the new route prefix may be obtained by the FIB entry optimizer from a RIB of the network device. The FIB entry optimizer may obtain an entry in response to a change in the RIB, e.g., a new entry is added to the RIB or an entry of the RIB is modified, where the RIB entry includes the new route prefix. The FIB entry optimizer may continuously select entries of the FIB, sequentially, randomly, or by any other method, for programming into the FIB.

Continuing with the discussion of FIG. 3, in Step 305, the FIB entry optimizer determines whether the FIB includes an entry including a supernet route prefix that may include the new route prefix. In one or more embodiments of the invention, a supernet route prefix may include the new route prefix if the supernet route prefix is a less specific prefix to which the new route prefix maps. The FIB entry optimizer may determine if each entry of the FIB including a supernet route prefix meets this requirement.

If the FIB includes an entry including a supernet route prefix that may include the new route prefix, the method proceeds to Step 310. If the FIB does not include an entry including a supernet route prefix that may include the new route prefix, the method proceeds to Step 345.

In Step 310, the FIB entry optimizer determines whether the new route prefix is to be programmed into the FIB or associated with the supernet route prefix. If the supernet route prefix has a next-hop that is different than the new route prefix, the FIB entry optimizer determined the new route prefix is to be programmed into the FIB. If the supernet route prefix has a next-hop that is the same as the new route prefix, the FIB entry optimizer determined the new route prefix is to be associated with the supernet route prefix.

If the new route prefix is to be programmed into the FIB, the method proceeds to Step 315. If the new route prefix is to be associated with the supernet route prefix, the method proceeds to Step 340.

In Step 315, the FIB entry optimizer programs the new route prefix into the FIB. Programming the new route prefix into the FIB may include loading the new route prefix into an entry of the FIB.

In Step 320, shown in FIG. 3B, the FIB entry optimizer determines whether a supernet route prefix is to be disaggregated in response to programming the new route prefix into the FIB. The FIB entry optimizer may determine the supernet route prefix is to be disaggregated if the supernet route prefix is associated with less than a predetermined number of route prefixes (e.g., three prefixes). If the supernet route prefix is to be disaggregated, the method proceeds to Step 325. If the supernet route prefix is not to be disaggregated, the method ends.

In Step 325, the FIB entry optimizer determines at least one route prefix associated with the supernet route prefix. As described with respect to the FIB entry optimizer, a supernet route prefix is used to consolidate multiple FIB entries of the FIB. Each of the multiple entries that were consolidated includes a route prefix. When the supernet route prefix is formed, the route prefixes are associated with the supernet route prefix. Thus, the at least one route prefix associated with the supernet route prefix may be determined by pre-existing associations between the supernet route prefix and the at least one route prefix.

In Step 330, the FIB entry optimizer programs the at least one route prefix associated with the supernet route prefix into the FIB. The FIB entry optimizer may program the at least one route prefix associated with the supernet route prefix into the FIB by loading the at least one route prefix into an entry of the FIB.

In Step 335, the FIB entry optimizer removes the supernet route prefix from the FIB. The FIB entry optimizer may remove the supernet route prefix from the FIB by deleting an entry of the FIB including the supernet route prefix. Following Step 335, the method may end.

Returning to FIG. 3A, in Step 340, the FIB entry optimizer associates the new route prefix with the supernet route prefix. The association may be stored on the network device. By associating the new route prefix with the supernet route prefix, the number of FIB entries may be reduced. Following Step 340, the method may end.

In Step 345, the FIB entry optimizer determines whether a new supernet route prefix may be formed. To determine if a new supernet route prefix may be formed, the FIB entry optimizer determines a less specific prefix to which the new route prefix and at least one route prefix of an entry of the FIB will map. If a new supernet route prefix may be formed, the method proceeds to Step 355. If a supernet route prefix may not be formed, the method proceeds to Step 350.

In Step 350, the FIB entry optimizer programs the new route prefix into the FIB. The FIB entry optimizer may program the new route prefix into the FIB by loading the new route prefix into an entry of the FIB. Following Step 350, the method may end.

In Step 355, the FIB entry optimizer generates a new supernet route prefix. The supernet route prefix may be generated as described with respect to FIB entry optimizer shown in FIG. 2. The new supernet route prefix may be based on the new route prefix and one or more route prefixes stored in one or more entries of the FIB.

In Step 360, the FIB entry optimizer associates the new route prefix and the one or more route prefixes with the new supernet route prefix. The associations may be stored on the network device.

In Step 365, the FIB entry optimizer programs the new supernet route prefix into the FIB. The FIB entry optimizer may program the super into the FIB by loading the new supernet route prefix into an entry of the FIB and deleting any entries of the FIB including prefixes associated with the new supernet route prefix. Programming the new supernet route prefix may reduce the number of entries in the FIB. Following Step 365, the method may end.

The process of consolidating FIB entries by programming supernet route prefixes by the method shown in FIGS. 3A and 3B is further described using an explanatory example. The following example is for explanatory purposes and is not intended to limit the scope of the technology.

Example 1

A FIB may include four entries. Each of the four entries may include one of the route prefixes 1.0.4.0/24, 1.0.5.0/24, 1.0.6.0/24, or 1.0.7.0/24. Each of the four entries may have a next-hop of Next Hop A via Interface 0/0/0/0. Thus, whenever a packet received by the network device identifies one of the route prefixes of the four entries, the network processor will forward the packet to the network device at Next Hop A on Interface 0/0/0/0 because all four route prefixes include the same next-hop.

To reduce the number of FIB entries, the FIB entry optimizer of the network device may form a supernet route prefix. The four route prefixes above have binary representations of the IP address as follows:

00000001.00000000.00000100.00000000
00000001.00000000.00000101.00000000
00000001.00000000.00000110.00000000
00000001.00000000.00000111.00000000.

All four of the route prefixes may be represented by, for example, a supernet route prefix of the less specific prefix 1.0.0.0/22 having a next-hop of 202.158.202.17 via Interface 0/0/0/0. The binary representation of the internet protocol address of the less specific prefix is 00000001.00000000.00000100.00000000. Due to the less specific prefix including a prefix of /22, only the first 22 bits of the binary representation of the less specific prefix are considered by the network processor when determining a next-hop. In other words, any bit pattern 00000001.00000000.000001XX.XXXXXXXX where X is a 1 or a 0 will match to the route prefix.

When the supernet route prefix 1.0.0.0/22 having a next-hop of Next Hop A via Interface 0/0/0/0 is programmed into the FIB, any packet received and addressed to any of 1.0.4.0/24, 1.0.5.0/24, 1.0.6.0/24, or 1.0.7.0/24, will be forwarded to Next Hop A via Interface 0/0/0/0.

Thus, in Example 1, the forwarding information base entry optimizer (125) may program the FIB by removing the four entries and loading a single entry with the supernet route prefix, e.g., 1.0.0.0/22.

FIG. 4 shows a flowchart according to one or more embodiments of the invention. The method depicted in FIG. 4 may be used to program a FIB in accordance with one or more embodiments of the invention. One or more steps shown in FIG. 4 may be omitted, repeated, and/or performed in a different order among different embodiments.

In Step 400, a FIB entry optimizer may identify a number of route prefixes stored in entries of the FIB that may be mapped to a potential whitespace route prefix. The FIB entry optimizer may use the FIB mirror to identify the aforementioned route prefixes. The identified route prefixes may be supernet route prefixes and/or non-supernet route prefixes (i.e., route prefixes stored in accordance with Step 315 or Step 350).

In one or more embodiments of the invention, the potential whitespace route prefix may be two sizes smaller than one of the number of route prefixes. For example, a FIB mirror may include an entry storing the route prefix 171.161.200.0/21. The FIB entry optimizer may generate a potential whitespace route prefix by reducing the prefix size of the entry by 2 to 171.161.200.0/19 (which may also be represented as 171.161.192.0/19). The less specific route prefix may be one, three, or any number of sizes smaller than the route entry on which the less specific prefix is based without departing from the invention.

In one embodiment of the invention, the potential whitespace route is determined by selecting an existing route prefix programmed in the FIB and then generating the potential whitespace route based upon the selected prefix. Once the potential whitespace route prefix has been generated, the entries in the FIB mirror (or the FIB) are analyzed to identify which of the entries (if any) are within the IP address space of the potential whitespace route prefix. The number of identified entries (each of which includes a route prefix) is used in Step 405.

In Step 405, the FIB entry optimizer determines a whitespace rate for the potential whitespace route prefix. A whitespace rate may be the ratio of the number of route prefixes of the FIB associated with a potential whitespace route prefix (i.e., the number of route prefixes identified in Step 400) divided by the total number of route prefixes covered by the potential whitespace route prefix. The total number of route prefixes covered by the potential whitespace route prefix may be calculated as follows:

Number_of_Route_Prefixes=2^(32−Whitespace_Prefix_Size)

where the variable Whitespace_Prefix_Size is the size of the potential whitespace route prefix. For example, if potential whitespace route prefix is 171.161.192.0/19, then the number of route prefixes are covered by potential whitespace route prefix is 8192 (2^(32−19)).

In Step 410, the FIB entry optimizer determines whether the whitespace rate is greater than a predetermined rate. In one or more embodiments of the invention, the predetermined rate may be between 30%-70%. Other values for the pre-determined rate may be used without departing from the invention. If the whitespace rate is greater than the predetermined rate, the method ends. If the whitespace rate is less than the predetermined rate, the method proceeds to Step 415.

In Step 415, the FIB entry optimizer generates a sets the potential whitespace route prefix to a whitespace route prefix.

In Step 420, the FIB entry optimizer associates the route prefixes (i.e., the route prefixes identified in step 400) with the whitespace route prefix. The associations may be stored in network devices.

In Step 425, the FIB entry optimizer programs the whitespace route prefix into the FIB. The FIB entry optimizer may program the generated whitespace route prefix into the FIB by loading the generated whitespace route prefix into an entry of the FIB and deleting any FIB entries including routing prefixes associated with the whitespace route prefix.

The above process may be performed multiple times in order to generate multiple whitespace route prefixes.

Consolidating FIB entries by programming a whitespace route prefix by the method shown in FIG. 4 is further described by way of an explanatory example. The following example is for explanatory purposes and is not intended to limit the scope of the technology.

Example 2

A FIB may include four entries: 171.161.200.0/21, 171.161.192.0/23, 171.161.196.0/22, or 171.161.208.0/20. To reduce the number of FIB entries, the FIB entry optimizer of the network device may identify 171.161.192.0/19 as a potential whitespace route prefix.

The FIB may determine a whitespace rate of the potential whitespace route prefix. In this example, the potential whitespace route prefix, e.g., 171.161.192.0/19, could map to 8192 route prefixes, e.g., 2^(32−19). Thus, the whitespace rate of Example 2 is 94% which is greater than a predetermined rate of 70%.

In response to determining the whitespace rate is greater than the predetermined rate of 70%, the FIB entry optimizer may program the whitespace route prefix, e.g., 171.161.192.0/19, into the FIB. The FIB entry optimizer may perform programming by loading the whitespace route prefix into an entry of the FIB and unload the four entries, e.g., 171.161.200.0/21, 171.161.192.0/23, 171.161.196.0/22, and 171.161.208.0/20, from the FIB.

Thus, the FIB entry optimizer may reduce the total number of entries in the FIB while maintaining the ability to forward packets to appropriate recipients.

In one or more embodiments of the invention, the methods shown in FIGS. 3-4 may be combined to reduce the number of entries of a FIB. For example, entries of the FIB may be consolidated into entries including supernet route prefixes by the method shown in FIGS. 3A-3B. The entries of the FIB may then be further consolidated into entries including whitespace route prefixes by the method shown in FIG. 4.

Consolidating FIB entries by programming both supernet route prefixes and whitespace route prefixes by the methods shown in FIGS. 3-4 is further described by way of an explanatory example. The following example is for explanatory purposes and is not intended to limit the scope of the technology.

Example 3

A FIB may include a set of route prefixes shown in the first column, labeled as Set of Route Prefixes, of Table 1. The set of route prefixes shown in Table 1 were extracted from the global internet routing table in April 2015 within the range of 1.72.0.0/13. The range includes 102 routing prefixes.

To forward packets, the set of route prefixes must be programmed into the FIB. To reduce the number of entries of the FIB, the methods shown in FIGS. 3-4 are applied to the set of route prefixes to consolidate multiple route prefixes into a smaller number of entries of the FIB.

Performing the method shown in FIG. 3 to the set of route prefixes results in the set of route prefixes consolidated into 35 supernet route prefixes as shown in column 2, labeled as Supernet route prefixes, of Table 1. For example, the route prefixes 1.72.0.0/22, 1.72.4.0/23, 1.72.6.0/23, 1.72.8.0/23, 1.72.10.0/23, 1.72.12.0/22, 1.72.16.0/20, 1.72.32.0/19, 1.72.64.0/18, 1.72.128.0/17, and 1.73.0.0/16 were consolidated into an entry including the supernet route prefix 1.72.0.0/15. In some cases, some route prefixes could not be consolidated into a supernet route prefix. For example, the route prefix 1.74.0.0/16 could not be consolidated and was programmed as an entry in the FIB.

Performing the method shown in FIG. 4 after the method shown in FIG. 3 results in the set of route prefixes consolidated into a single entry including a whitespace route prefix as shown in column 3, labeled as Whitespace Route Prefixes, of Table 1.

Thus, as seen in Table 1, performing the methods of programming a FIB as shown in FIGS. 3-4 to the set of route prefixes results in the set of route prefixes being consolidated into a single entry, 1.72.0.0/13.

TABLE 1

Example route prefixes, supernet route prefixes, and whitespace route prefixes.

| Set of Route Prefixes (102 route prefixes) | Supernet route prefixes (35 supernets) | Whitespace Route Prefixes (1 route prefix) |
| --- | --- | --- |
| 1.72.0.0/22 1.72.4.0/23 1.72.6.0/23 1.72.8.0/23 1.72.10.0/23 1.72.12.0/22 1.72.16.0/20 1.72.32.0/19 1.72.64.0/18 1.72.128.0/17 1.73.0.0/16 | 1.72.0.0/15 | 1.72.0.0/13 |

TABLE 1-continued

Example route prefixes, supernet route prefixes, and whitespace route prefixes.

| Set of Route Prefixes (102 route prefixes) | Supernet route prefixes (35 supernets) | Whitespace Route Prefixes (1 route prefix) |
|---|---|---|
| 1.74.0.0/16 | 1.74.0.0/16 | |
| 1.75.0.0/23 1.75.2.0/24 1.75.3.0/24 1.75.4.0/22 | 1.75.0.0/21 | |
| 1.75.8.0/23 1.75.10.0/24 1.75.11.0/24 | 1.75.8.0/22 | |
| 1.75.12.0/23 | 1.75.12.0/23 | |
| 1.75.14.0/24 | 1.75.14.0/24 | |
| 1.75.16.0/21 1.75.24.0/22 1.75.28.0/22 | 1.75.16.0/20 | |
| 1.75.32.0/19 | 1.75.32.0/19 | |
| 1.75.64.0/18 | 1.75.64.0/18 | |
| 1.75.128.0/20 1.75.144.0/21 1.75.152.0/21 1.75.160.0/20 1.75.176.0/21 1.75.184.0/22 | 1.75.128.0/18 | |
| 1.75.188.0/22 | | |
| 1.75.196.0/22 | 1.75.196.0/22 | |
| 1.75.200.0/21 | 1.75.200.0/21 | |
| 1.75.208.0/22 1.75.212.0/22 1.75.216.0/21 | 1.75.208.0/20 | |
| 1.75.224.0/22 | 1.75.224.0/22 | |
| 1.75.228.0/24 | 1.75.228.0/24 | |
| 1.75.244.0/22 | 1.75.244.0/22 | |
| 1.75.248.0/21 | 1.75.248.0/21 | |
| 1.76.0.0/15 | 1.76.0.0/15 | |
| 1.78.0.0/22 1.78.4.0/22 1.78.8.0/22 1.78.12.0/22 1.78.16.0/22 1.78.20.0/22 1.78.24.0/22 1.78.28.0/22 1.78.32.0/22 1.78.36.0/221.78.40.0/22 1.78.44.0/22 1.78.48.0/201.78.64.0/18 1.78.128.0/17 | 1.78.0.0/16 | |
| 1.79.2.0/24 | 1.79.2.0/23 | |
| 1.79.3.0/24 | | |
| 1.79.4.0/24 | 1.79.4.0/24 | |
| 1.79.6.0/23 | 1.79.6.0/23 | |
| 1.79.8.0/23 1.79.10.0/24 1.79.11.0/241.79.12.0/22 | 1.79.8.0/21 | |
| 1.79.16.0/22 1.79.20.0/24 1.79.21.0/24 1.79.22.0/23 | 1.79.16.0/20 | |
| 1.79.24.0/22 | | |
| 1.79.28.0/23 1.79.30.0/24 1.79.31.0/24 | | |
| 1.79.32.0/22 1.79.36.0/22 1.79.40.0/21 1.79.48.0/20 | 1.79.32.0/19 | |
| 1.79.66.0/23 | 1.79.66.0/23 | |
| 1.79.68.0/22 | 1.79.68.0/22 | |
| 1.79.72.0/23 1.79.74.0/23 1.79.76.0/22 | 1.79.72.0/21 | |
| 1.79.80.0/23 1.79.82.0/23 1.79.84.0/22 1.79.88.0/23 1.79.90.0/23 1.79.92.0/22 | 1.79.80.0/20 | |
| 1.79.96.0/23 1.79.98.0/23 1.79.100.0/22 1.79.104.0/21 1.79.112.0/20 | 1.79.96.0/19 | |
| 1.79.128.0/19 | 1.79.128.0/19 | |
| 1.79.160.0/20 | 1.79.160.0/20 | |
| 1.79.176.0/23 1.79.178.0/23 1.79.180.0/23 1.79.182.0/23 | 1.79.176.0/21 | |
| 1.79.216.0/21 | 1.79.216.0/21 | |
| 1.79.224.0/19 | 1.79.224.0/19 | |

By programming the whitespace route prefix, 1.72.0.0/13, the FIB will forward packets having route prefixes of 1.75.15.0/24, 1.75.192.0/22, 1.75.229.0/24, 1.75.230.0/23, 1.75.232.0/21, 1.75.240.0/22, 1.79.0.0/23, 1.79.5.0/24, 1.79.64.0/23, t1.79.184.0/21, 1.79.192.0/20, and 1.79.208.0/21 that were not in the set of route prefixes, e.g., addresses of network devices that do not exist.

In one or more embodiments of the invention, when a whitespace route prefix is programmed into an entry of the FIB by the FIB entry optimizer the FIB entry optimizer may program additional entries into the FIB that cause packets addressed to network devices that do not exist to a null route prefix. A null route prefix indicates that the packet is not to be forwarded. With respect to example 3, the FIB entry optimizer may program entries into the FIB having the route prefixes of 1.75.15.0/24, 1.75.192.0/22, 1.75.229.0/24, 1.75.230.0/23, 1.75.232.0/21, 1.75.240.0/22, 1.79.0.0/23, 1.79.5.0/24, 1.79.64.0/23, t1.79.184.0/21, 1.79.192.0/20, and 1.79.208.0/21 with a next-hop of null.

While the methods shown in FIGS. 3-4 have been directed towards programming a route prefix into the FIB, in some cases a route prefix may be needed to be deprogrammed from the FIB.

FIG. 5 shows a flowchart according to one or more embodiments of the invention. The method depicted in FIG. 5 may be used to program a FIB in accordance with one or more embodiments of the invention. One or more steps shown in FIG. 5 may be omitted, repeated, and/or performed in a different order among different embodiments.

In Step 500, a FIB entry optimizer obtains a route prefix to be deprogrammed from a FIB. The route prefix may be obtained by the FIB entry optimizer from a RIB of a network device. In one or more embodiments of the invention, the FIB entry optimizer may obtain an entry in response to a change in the RIB, e.g., a RIB entry is deleted.

In Step 505, the FIB entry optimizer determines whether the route prefix is associated with a whitespace route prefix stored in an entry of the FIB. If the FIB entry optimizer determines the route prefix is associated with a whitespace route prefix stored in an entry of the FIB, the method proceeds to Step 510. If the FIB entry optimizer determines the route prefix is not associated with a whitespace route prefix stored in an entry of the FIB, the method proceeds to Step 515.

In Step 510, the FIB entry optimizer disassociates the route prefix from the whitespace route prefix. Following Step 510, the method may end.

In Step 515, the FIB entry optimizer determines whether the route prefix is associated with a supernet route prefix stored in an entry of the FIB. If the FIB entry optimizer determines the route prefix is associated with a supernet route prefix stored in an entry of the FIB, the method proceeds to Step 525. If the FIB entry optimizer determines the route prefix is not associated with a supernet route prefix stored in an entry of the FIB, the method proceeds to Step 520.

In Step 520, the FIB entry optimizer deprograms the route prefix from the forwarding information base. The FIB entry optimizer may deprogram the route prefix from the forwarding information base by deleting an entry of the FIB including the route prefix. After Step 520, the method may end.

In Step 525, the FIB entry optimizer determines whether the supernet route prefix is to be disaggregated. If the FIB entry optimizer determines the supernet route prefix is to be disaggregated, the method proceeds to Step 530. If the FIB entry optimizer determines the supernet route prefix is not to be disaggregated, the method proceeds to Step 535.

In Step 530, the FIB entry optimizer programs any route prefixes that are associated with the supernet route prefix into the forwarding information base and deprograms the supernet route prefix from the FIB. After Step 530, the method may end.

In Step 535, the FIB entry optimizer disassociates the route prefix from the supernet route prefix. After Step 535, the method may end.

One or more embodiments of the invention may provide the following advantages. By programming the FIB to forward packets using fewer entries than included in the RIB, the hardware and/or computational requirements of performing packet forwarding are reduced. For example, Table 2 shows an example of applying the methods shown in FIGS. 3-5 to the internet routing table of April, 2015.

As seen in column 2, labeled FIB, of Table 2, there are 644,414 route prefixes that need to be programmed into the FIB to forward packets. By applying the method shown in FIG. 3 to the to-be-programmed route prefixes, the route prefixes are consolidated into 195,491 route prefixes by using supernet route prefixes.

After consolidation by supernet route prefixes, the number of route prefixes is further consolidated by whitespace route prefixes by the method shown in FIG. 5. As seen in column 4 of Table 2, the number of route prefixes is reduced to 123,766.

Thus, the methods shown in FIGS. 3-5 have reduced the number of entries of the FIB by 80.7% while still properly forwarding packets to the desired recipient.

TABLE 2

Example to-be-programmed FIB prefixes before and after applying the methods of FIGs. 3-5.

| RIB next hop | To-be-programmed Route Prefixes | Supernet Route Prefixes | Whitespace Route Prefixes |
|---|---|---|---|
| Next Hop A | 345503 prefixes | 95977 prefixes | 53926 prefixes |
| Next Hop B | 5329 prefixes | 2486 prefixes | 2215 prefixes |
| Next Hop C | 43167 prefixes | 14819 prefixes | 13120 prefixes |
| Next Hop D | 250132 prefixes | 82209 prefixes | 54440 prefixes |
| Next Hop E | 283 prefixes | 65 prefixes | 65 prefixes |
| Summary | 644414 prefixes | 195491 prefixes (3.2× saving) | 123766 prefixes (further 1.6× saving, 5.2× saving total) |

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for programming route prefixes in a forwarding information base of a network device, wherein the method comprises:
   identifying, by a forwarding information base entry optimizer, a new route prefix from a routing information base to be programmed into the forwarding information base;
   determining, by the forwarding information base entry optimizer, whether the forwarding information base includes an entry having a supernet route prefix that includes the new route prefix, wherein the supernet route prefix is a less specific routing prefix associated with multiple more specific route prefixes having a same next-hop;
   in response to the forwarding information base entry optimizer determining that the supernet route prefix includes the new route prefix, determining whether a next-hop of the supernet route prefix is different than a next-hop of the new route prefix;
   in response to the forwarding information base entry optimizer determining that the next-hop of the supernet route prefix is different from the next-hop of the new route prefix, programming the new route prefix into the forwarding information base; and
   in response to the forwarding information base entry optimizer determining that the next-hop of the supernet route prefix is the same as the next-hop of the new route prefix, associating the new route prefix with the supernet route prefix.

2. The method of claim 1, further comprising, in response to programming the new route prefix into the forwarding information base, determining whether the supernet route prefix is to be disaggregated and, in response to determining that the supernet route prefix is to be disaggregated, disaggregating the supernet route prefix.

3. The method of claim 2, wherein determining whether the supernet route prefix is to be disaggregated comprises:
   determining whether the supernet route prefix is associated with less than a predetermined number of route prefixes; and
   determining that the supernet route prefix is to be disaggregated in response to determining that the supernet route prefix is associated with less than the predetermined number of route prefixes.

4. The method of claim 2, wherein disaggregating the supernet route prefix comprises:
 determining at least one route prefix associated with the supernet route prefix;
 programming the at least one route prefix associated with the supernet route prefix into the forwarding information base; and
 removing the supernet route prefix from the forwarding information base.

5. The method of claim 1, further comprising, in response to determining that the supernet route prefix does not include the new route prefix, determining whether a new supernet can be formed.

6. The method of claim 5, wherein determining whether the new supernet can be formed comprises determining a less specific prefix to which the new route prefix and at least one route prefix of an entry of the forwarding information base will map.

7. The method of claim 5, further comprising, in response to determining that no new supernet can be formed, programming the new route prefix into the forwarding information base.

8. The method of claim 5, further comprising, in response to determining that the new supernet can be formed, generating the new supernet.

9. The method of claim 8, further comprising, after generating the new supernet:
 associating the new route prefix and the one or more route prefixes with the new supernet route prefix; and
 programming the new supernet route prefix into the forwarding information base.

10. A network device, comprising:
 memory; and
 a processor, wherein the processor is configured to perform a method, the method comprising:
  identifying, by a forwarding information base entry optimizer, a new route prefix from a routing information base to be programmed into the forwarding information base;
  determining, by the forwarding information base entry optimizer, whether the forwarding information base includes an entry having a supernet route prefix that includes the new route prefix, wherein the supernet route prefix is a less specific routing prefix associated with multiple more specific route prefixes having a same next-hop;
  in response to the forwarding information base entry optimizer determining that the supernet route prefix includes the new route prefix, determining whether a next-hop of the supernet route prefix is different than a next-hop of the new route prefix;
  in response to the forwarding information base entry optimizer determining that the next-hop of the supernet route prefix is different from the next-hop of the new route prefix, programming the new route prefix into the forwarding information base; and
  in response to the forwarding information base entry optimizer determining that the next-hop of the supernet route prefix is the same as the next-hop of the new route prefix, associating the new route prefix with the supernet route prefix.

11. The network device of claim 10, the method further comprising, in response to programming the new route prefix into the forwarding information base, determining whether the supernet route prefix is to be disaggregated and, in response to determining that the supernet route prefix is to be disaggregated, disaggregating the supernet route prefix.

12. The network device of claim 11, wherein determining whether the supernet route prefix is to be disaggregated comprises:
 determining whether the supernet route prefix is associated with less than a predetermined number of route prefixes; and
 determining that the supernet route prefix is to be disaggregated in response to determining that the supernet route prefix is associated with less than the predetermined number of route prefixes.

13. The network device of claim 11, wherein disaggregating the supernet route prefix comprises:
 determining at least one route prefix associated with the supernet route prefix;
 programming the at least one route prefix associated with the supernet route prefix into the forwarding information base; and
 removing the supernet route prefix from the forwarding information base.

14. The network device of claim 10, the method further comprising, in response to determining that the supernet route prefix does not include the new route prefix, determining whether a new supernet can be formed.

15. The network device of claim 14, wherein determining whether the new supernet can be formed comprises determining a less specific prefix to which the new route prefix and at least one route prefix of an entry of the forwarding information base will map.

16. The network device of claim 14, the method further comprising, in response to determining that no new supernet can be formed, programming the new route prefix into the forwarding information base.

17. The network device of claim 14, the method further comprising, in response to determining that the new supernet can be formed, generating the new supernet.

18. The network device of claim 17, the method further comprising, after generating the new supernet:
 associating the new route prefix and the one or more route prefixes with the new supernet route prefix; and
 programming the new supernet route prefix into the forwarding information base.

19. A non-transitory computer readable medium comprising instructions that, when executed by a processor, perform a method for programming route prefixes in a forwarding information base of a network device, the method comprising:
 identifying, by a forwarding information base entry optimizer, a new route prefix from a routing information base to be programmed into the forwarding information base;
 determining, by the forwarding information base entry optimizer, whether the forwarding information base includes an entry having a supernet route prefix that includes the new route prefix, wherein the supernet route prefix is a less specific routing prefix associated with multiple more specific route prefixes having a same next-hop;
 in response to the forwarding information base entry optimizer determining that the supernet route prefix includes the new route prefix, determining whether a next-hop of the supernet route prefix is different than a next-hop of the new route prefix;
 in response to the forwarding information base entry optimizer determining that the next-hop of the supernet route prefix is different from the next-hop of the new route prefix, programming the new route prefix into the forwarding information base; and in response to the forwarding information base entry optimizer determining that the next-hop of the supernet route prefix is the same as the next-hop of the new route prefix, associating the new route prefix with the supernet route prefix.

20. The non-transitory computer readable medium of claim 19, further comprising:

in response to programming the new route prefix into the forwarding information base,
   determining whether the supernet route prefix is to be disaggregated by
   determining whether the supernet route prefix is associated with less than a predetermined number of route prefixes, and
   determining that the supernet route prefix is to be disaggregated in response to determining that the supernet route prefix is associated with less than the predetermined number of route prefixes; and in response to determining that the supernet route prefix is to be disaggregated, disaggregating the supernet route prefix by
   determining at least one route prefix associated with the supernet route prefix,
   programming the at least one route prefix associated with the supernet route prefix into the forwarding information base, and
   removing the supernet route prefix from the forwarding information base.

* * * * *